Aug. 27, 1968   R. F. McGIVERN ET AL   3,398,631
PROJECTED SCALE MICROMETER FOR MICROSCOPE
Filed Dec. 23, 1964   2 Sheets-Sheet 1

ROBERT F. McGIVERN
ROBERT T. SHONE
INVENTORS

BY *Frank C. Parker*

ATTORNEY

Aug. 27, 1968     R. F. McGIVERN ETAL     3,398,631
PROJECTED SCALE MICROMETER FOR MICROSCOPE
Filed Dec. 23, 1964     2 Sheets-Sheet 2
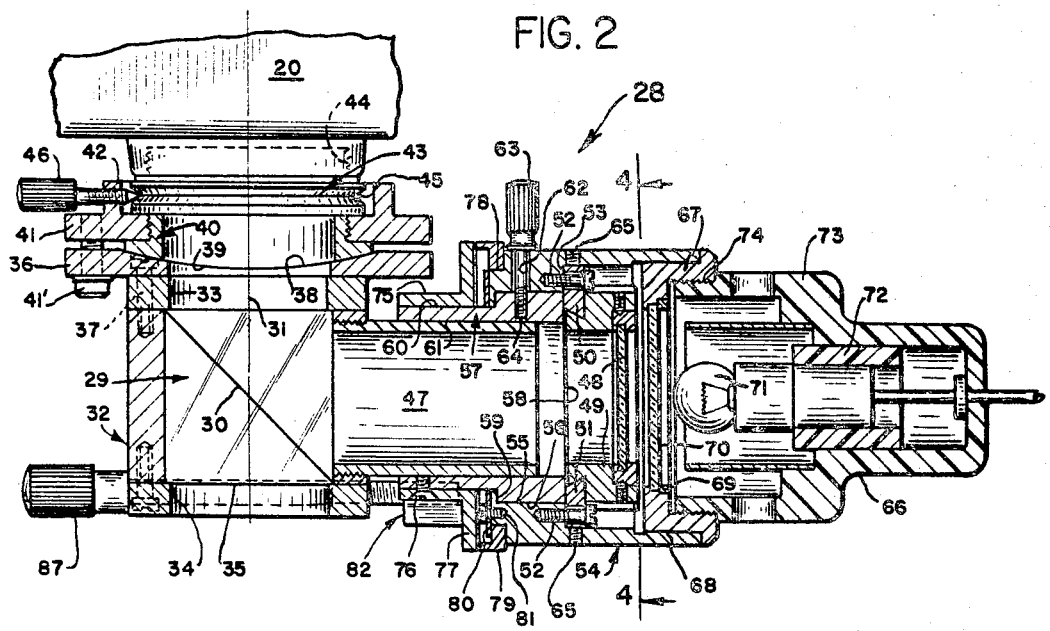
ROBERT F. McGIVERN
ROBERT T. SHONE
INVENTORS
BY Frank C. Parker
ATTORNEY

United States Patent Office 3,398,631
Patented Aug. 27, 1968

3,398,631
PROJECTED SCALE MICROMETER
FOR MICROSCOPE
Robert F. McGivern, Irondequoit, and Robert T. Shone, Pittsford, N.Y., assignors to Bausch & Lomb Incorporated, Rochester, N.Y., a corporation of New York
Filed Dec. 23, 1964, Ser. No. 420,633
1 Claim. (Cl. 88—14)

ABSTRACT OF THE DISCLOSURE

A non-contact projected scale micrometric measuring device wherein the image of an illuminated scale is projected by a beam divider, located in a stereooptical lens system, into the focal plane of the system along with the image of an object to be measured which is located in the object plane of said system, the device being constructed to facilitate rotation of said scale in the field of view of the instrument.

---

The present invention relates to a non-contact type of measuring device for a stereomicroscope and more particularly relates to improvements therein.

Photointerpreters and photogrammetrists have an increasing need of a versatile precision means of measuring point-to-point distances on photographs. There is a continuing need for an improved precision in order to upgrade the work of the photogrammetrist in an effort to extend and diversify the uses of photogrammetry as well as to improve known techniques.

In view of these needs, it is an object of the present invention to provide a novel projected scale micrometer device for non-contact type measurements of point-to-point distances on photogrammetric dispositives and the like.

It is a further object to provide such a device which is used in combination with a stereomicroscope to serve diversified precision measurement tasks by quickly converting or adjusting the parts of the combination.

Further objects and advantages will be found in the form and arrangement of the parts of said device and in the detailed structure thereof as described in the following specification and shown in the accompanying drawing, wherein:

FIG. 2 is a longitudinal sectional view of a projected scale micrometer device;

FIG. 3 is a plan view of the device shown in FIG. 2; and

As aforesaid, the invention concerns the measurement in a careful and precise manner of the point-to-point distances and/or angular features forming a photographic image on film or glass plates which may have substantial thickness. Because of said thickness and the fact that it is often desirable to view and measure the photographic imagery through the supporting glass plate or film base without introducing distortions or refractive errors in the measurements or without the potentially damaging method of placing a scale in contact with the emulsion, the projected scale micrometer used in conjunction with a stereomicroscope is a useful tool for making photogrammetric measurements.

Figure 1:
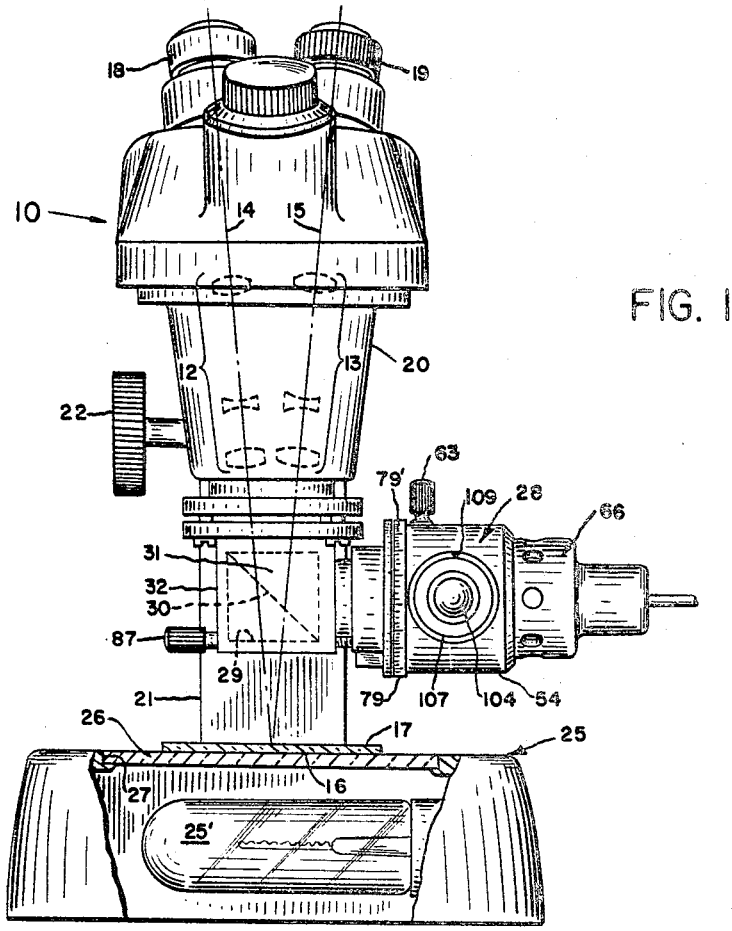
FIG. 1 is a representation of a preferred form of the present invention showing a general assembly thereof in front elevation.

In FIG. 1 of the drawings, a stereoscopic microscope is designated generally by the numeral 10, said microscope having a pair of objectives which are diagrammatically designated 12 and 13. The objectives 12 and 13 have a stereopair of converging axes 14 and 15 which meet at the image surface 16 of a diapositive 17. For viewing the image surface 16, a pair of eyepieces 18 and 19 are provided which are focused on the images formed by said objectives.

Objectives 12 and 13 are housed and operatively arranged in a housing 20 which is mounted in any preferred manner for vertical motion on a microscope arm 21. A suitable coarse adjustment mechanism, not shown, connected between said housing 20 and the arm 21, is provided for effecting said vertical motion, said mechanism being actuated by a suitable knob 22.

Further comprised in said stereomicroscope is a stage 25 having a working surface which is provided by a sheet of light diffusing translucent glass 26 which spans an opening 27 in the base portion thereof. In the opening 27, a substage lamp 25' is located in a position to transilluminate the diapositive 17, said lamp being energized from a suitable electrical energy source in the usual manner, not shown.

Acording to the present invention, a projected scale micrometer device generally indicated by the numeral 28 is provided for projecting an illuminated scale into coincidence with the image bearing surface 16 of a diapositive 17 so that the scale appears to lie on said surface. The advantageous structures found in said device 28 and described herebelow account for the versatility and adaptability of the device to meet measuring problems encountered by photointerpreters.

The projected scale device 28 primarily comprises a cube type of beam divider 29, the beam splitting surface 30 of which is symmetrically positioned on the central axis 31 of the microscope and is traversed by the two stereo axes 14 and 15. Said beam divider is retained within a close fitting housing 32 having top and bottom openings 33 and 34 respectively.

It is strictly necessary to establish the lower surface 35 of the beam divider 29 parallel to the glass plate 26 and for this purpose a spherically surfaced joint is provided between the housing 32 and housing 20. Said joint is constituted by a joint plate 36 which is fixed to the housing 32 in any suitable manner such as cap screws 37, said plate having a concave spherical surface 38 formed therein. In contact with the concave surface 38 is a mating convex surface 39 formed on an intermediate ring 40 which is effectually a part of an upper joint plate 41. Connecting plates 36 and 41 together is a trio of equally spaced adjusting screws 41' whereby the parts of the joint may properly be aligned to correctly position the beam divider surface 35.

On the upper side of the joint plate 41 is formed an upstanding annual flange 42 which is a constituent part of a demountable coupling between the projected scale micrometer unit 28 and the microscope housing 20. Said coupling comprises a support ring 43 which is provided with a threaded extension 44, said extension being engageable with a corresponding thread formed on the lower side of the microscope housing 20 against which the ring 43 is secured.

To provide demountability of the assembly 28 as well as to provide radial alignment adjustments between the microscope 10 and measuring unit 28, a V groove 45 is formed in the peripheral surface of the support ring 43 and a plurality of pointed screws 46 are threaded through the ring or flange 42 so as to engage with the lower face of the V groove 45 whereby the ring 43 is forced against the bottom surface of the accommodating recess.

In one side wall of the beam divider housing 32 a body tube 47 is secured whereon the other members of the measuring unit are held. One of such members is the reticle plate 48 whereon is formed the measuring scale in any desired form, the background areas being opaque and the scale being formed by clear areas through which light is projected.

An advantageous adjustment of angular orientation of the reticle scale or other mark in the field of view is provided by mounting the reticle plate 48 in a slide 49 which is slidably fitted to move on a pair of slideways 50, 51. To provide rotational orientation of the reticle in the field of view, said slideways 50, 51 are secured by suitable cap screws 52 to an interior radial wall 53 of a cylindrical housing 54. Said housing 54 is closely fitted on its interior bearing surface 55 to rotate on the cylindrical outer surface 56 of a non-rotatable support sleeve 57. The surface 56 is actually the outer diameter of a head which terminates on one side in a front radial surface 58 and on the opposite side in a parallel radial surface 59 which at its least diameter joins an elongated cylindrical surface 60. A bore 61 extending through the mounting sleeve 57 is slidably fitted onto the outer surface of the body tube 47. Since the cylindrical housing 54 is rotatably mounted as above described, any angular movement thereof causes the slideways 50, 51 to tilt and consequently alignment of the scale with the features of the map image is afforded. For locking the housing 54 against rotation on sleeve 57, an elongated slot 62 is formed peripherally of at least 180° length. Passing through the slot 62 is a lock screw 63 whereon a clamping shoulder is formed which is drawn down against the outer surface of the housing 54 by a threaded connection 64. All moving parts of the above-described mechanism are totally enclosed to exclude dust and other foreign matter.

Limited adjustment of the parallelism of the slideways 50, 51 is secured by making clearance holes for the screws 52 in the slideways and providing a set of adjustment screws 65 which are threaded through the wall of the housing 54 so as to bear against the opposite ends of the slideways.

In the end of the cylindrical housing 54 an illumination assembly 66 is held, said assembly comprising an annular mounting member 67 which is held in the housing by means of a sleeve bearing 68 with three radial set screws, not shown. Held by any suitable means such as a retainer ring 69 is a diffusing screen or plate 70. Beyond the diffusing plate 70 is a lamp 71 which is mounted in the assembly 66 by a lamp socket 72 and its ventilated lamp casing 73 which is held in housing 54 by means of a thread 74.

Means for reading the angular position of the slide 49 are provided comprising a collar 75 which fits over the shank portion of the mounting sleeve 57 and is fixed thereto by a screw 76 in spaced relation to the wall 59. A radial flange 77 bearing a suitable index mark 77' is formed on the collar 75. On the adjacent end of the cylindrical housing 54, a reduced diameter portion 78 is formed whereon a scale ring 79 is rotatably mounted. As shown in FIG. 3, a suitable scale 79' is formed on the ring 79. Although the ring 79 is fitted to rotate freely on the portion 78, a frictional drag spring 80 is secured to the end face of the cylindrical housing 54 by a screw or rivet 81 so as to bear frictionally on said ring and cause the scale ring and housing to rotate as a unit.

Advantageously, the flange 77 is used not only for supporting the index mark 77' but is additionally used for mounting a nut member 82 which is held thereon in any preferred manner such as the countersunk screw 82'. Alternatively, the nut member 82 may be formed integrally with flange 77.

Another feature of the invention is the mechanism by which the reticle plate 48 is brought into focus of the microscope optical system. The focusing mechanism is so constructed that its serves primarily to provide a longitudinal focusing movement and secondarily serves to prevent rotational movement of the support sleeve 57. To effect this action, a focusing screw 83 is threaded at one end into the aforesaid nut member 82 and is directionally guided and journaled in a pair of bosses 84 and 85 formed on the rear wall 86 so as to prevent rotation of support sleeve 57. In order to counteract end thrust of the focusing screw 83 when the knob 87 is rotated there is a thrust shoulder 88 on the focusing screw shaft which restrains the shaft from moving in one direction and the knob 87 to restrain motion in the opposite direction.

Figure 4:
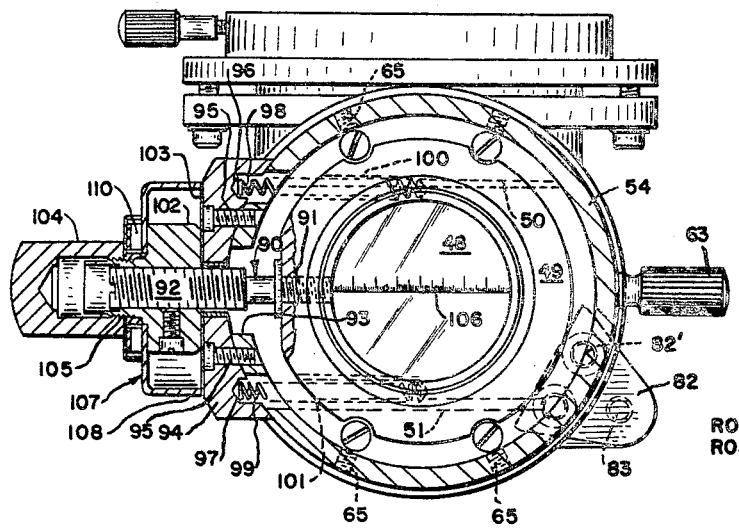
FIG. 4 is a sectional view taken on the line 4—4 of FIG. 2.

Mechanism is provided for moving the slide 49 in a precise manner along its slideways 50 and 51 as shown in FIG. 4, said mechanism comprising a thrust member 90 which is anchored in any preferred manner such as threads 91 in the slide 49. Said thrust member 90 extends radially outwardly and is provided with an elongated threaded part 92 which projects freely through a clearance opening 93 in the cylindrical housing 54. On the exterior surface of housing 54 an anchor or abutment plate 94 is fixed by a plurality of screws 95 which extend through said plate and are threaded into said housing, said plate having a central clearance opening through which the threaded part 92 passes. In the inner side of the anchor plate 94 is provided a pair of blind openings 96, 97 wherein a pair of return springs 98, 99 are seated and extend through clearance openings in said housing, the other ends thereof being seated in aligned blind holes 100, 101 formed in slide 49 on opposite sides of the thrust member axis.

One advantage of such a construction for seating the return springs 98 and 99 is that assembly and disassembly of said springs is quick and easy since it is only necessary to release the screws 95 in the abutment plate when it is desired to disassemble both springs. A second advantage of providing a spring abutment member 94 which is exterior to the housing 54 is that the springs may be longer so as to improve the spring action.

To move the slide 49 along the slideways 50 and 51 in opposition to the force of the springs 98 and 99, a nut member 102 is threaded onto the threaded part 92 of the thrust member 90 and said nut member is pressed against the outer surface 103 of the plate 94 by the action of said springs. The nut member 102 includes a knob 104 which is suitably fixed to the nut portion as by interconnecting threads 105.

As shown in FIG. 4, a suitable scale 106 is formed on the reticle plate 48, and the least division on said scale is equal to the pitch of the micrometer screw thread 92. On the nut member 102 is freely mounted a circular cup-like shell 107 whereon a circular scale 108 is formed, the number of divisions thereon preferably being 100 so that each small division on scale 108 represents $\frac{1}{100}$ of the smallest division on scale 106.

In order that the zero division of scale 108 may be brought into coincidence with an index mark 109 formed on plate 94 when the scale 106 is moved to any longitudinal position, the shell 107 is freely rotatably mounted on the nut member 102. A detent 110, preferably formed from wavy spring metal, is interposed under pressure between the nut member and shell 107 to obtain the above-mentioned detent effect.

It will be understood that the aseembly of the return springs in their respective recessed seats 100 and 101 in the slide 49 is much expedited and improved by the use of the exterior abutment plate 94 for the springs, the whole operation requiring the manipulation of only two screws 95. Furthermore, from the foregoing it will be understood that most parts are ingeniously designed to promote easy servicing of the instrument and simplicity of structure.

Although only certain forms of structure have been shown and described in detail, other forms are possible and changes may be made in the details of construction without departing from the spirit of the invention as defined in the claim herebelow.

We claim:
1. A projected scale non-contact micrometer device in which the scale is imaged at the convergence point of the axes of two stereomicroscopic optical systems inclined at equal angles from a vertical central axis through said point whereby non-contact point-to-point measurements of a transilluminated diapositive having considerable thickness and located in the focal plane of said stereomicroscope is facilitated, said device having a beam divider which is positioned above said plane obliquely across both of said inclined axes and across the central axis at 45° thereto and facing toward said systems, a housing wherein said divider is held, the housing being secured to said stereomicroscope, a reticle plate having a surface whereon a scale is formed, said surface being located parallel to said vertical axis and normal to a horizontal axis extending from the point of intersection of said beam divider and said vertical axis, the distance from the intersection point to said plate being conjugate to the vertical distance from the intersection point to the image bearing surface of said diapositive, a horizontal body tube fixed at one end in said housing coaxially with said horizontal axis, the improvement which comprises, a cylindrical housing carried concentrically by said tube and enclosing said reticle plate, a pair of concentric walls forming a bore and a counterbore in tendem in said cylindrical housing, a radial planar crosswall joining said bore and counterbore, a slide member in which said reticle plate is held, said member having a pair of parallel slideways formed along two opposite sides thereof, a pair of slideways formed horizontally on said crosswall and engaging said parallel slideways, a thrust screw anchored in said slide member and projecting horizontally outwardly through an opening in said cylindrical housing, an abutment plate fixed onto the exterior surface of the cylindrical housing surrounding said opening and free of said thrust screw, a nut member threaded onto said thrust screw and bearing against the outer surface of said abutment plate for moving the slide member upon rotation of the nut member, a pair of compression springs positioned in recesses formed in said reticle plate parallel to said slideways on opposite sides of the screw and seated at one end forcibly against said slide, the other ends of said springs extending freely through aligned openings in said cylindrical housing and abutting forcibly against the abutment plate to draw the nut member against said plate, a support sleeve slidably mounted on said body tube, and an enlarged annular head portion formed on said sleeve in contact with said bore in the housing, said head having an exterior bearing surface formed thereon which is rotatably fitted to said bore so that rotation of the cylindrical housing thereon causes a change in angular position of said reticle plate carried thereby.

References Cited
UNITED STATES PATENTS

| | | |
|---|---|---|
| 2,431,666 | 11/1947 | Fassin. |
| 2,510,145 | 6/1950 | Short. |
| 2,674,152 | 4/1954 | Wilkinson _____ 350—71 X |
| 2,942,345 | 6/1960 | Goldberg _____ 350—10 X |
| 2,942,519 | 6/1960 | Boughton et al. _____ 350—71 X |
| 3,060,792 | 10/1962 | Brunson. |

FOREIGN PATENTS

| | | |
|---|---|---|
| 586,081 | 12/1958 | Italy. |

JEWELL H. PEDERSEN, *Primary Examiner.*

A. A. KASHINSKI, *Assistant Examiner.*